(12) United States Patent
Takhim

(10) Patent No.: US 7,361,323 B2
(45) Date of Patent: Apr. 22, 2008

(54) METHOD FOR THE PRODUCTION OF PHOSPHORIC ACID AND/OR A SALT THEREOF AND PRODUCTS THUS OBTAINED

(75) Inventor: Mohamed Takhim, Lovain-la-Neuve (BE)

(73) Assignee: ECOPHOS, Louvain (BE)

( * ) Notice: Subject to any disclaimer, the term of this patent is extended or adjusted under 35 U.S.C. 154(b) by 287 days.

(21) Appl. No.: 10/519,562

(22) PCT Filed: Jun. 26, 2003

(86) PCT No.: PCT/BE03/00111

§ 371 (c)(1),
(2), (4) Date: Dec. 28, 2004

(87) PCT Pub. No.: WO2004/002888

PCT Pub. Date: Jan. 8, 2004

(65) Prior Publication Data

US 2005/0238558 A1   Oct. 27, 2005

(30) Foreign Application Priority Data

Jun. 28, 2002   (BE) .................................. 2002/0416

(51) Int. Cl.
*C01B 25/22*   (2006.01)
*C01B 25/32*   (2006.01)
(52) U.S. Cl. ................................. 423/321.2; 423/157.3
(58) Field of Classification Search ............ 423/157.3, 423/321.2
See application file for complete search history.

(56) References Cited

U.S. PATENT DOCUMENTS 3,304,157 A   2/1967   Baniel et al.

(Continued)

FOREIGN PATENT DOCUMENTS

ES   2013211   4/1990

(Continued)

OTHER PUBLICATIONS

Database WPI, Section Ch, Week 199002, Derwent Pub. Ltd., London, XP002236426 of SU 1470663 a (A.G. Poluboyart et al.), Apr. 7, 1989 (Abstract).

(Continued)

*Primary Examiner*—Wayne A. Langel
(74) *Attorney, Agent, or Firm*—Dykema Gossett PLLC

(57) ABSTRACT

A method for the production of phosphoric acid comprising a phosphate ore attack by a first aqueous chlorohydric acid solution, separation in the attack liquor between a solid insoluble phase containing impurities and a separate aqueous phase comprising phosphate ions in a solution, chloride ions and calcium ions, neutralization of said attack phase separated from the liquor by adding a calcium compound so that water-insoluble calcium phosphate can be formed with said phosphate ions, precipitating a separation in said neutralized aqueous phase comprising chloride ions and calcium ions in a solution and a solid precipitated phase based on said water-insoluble calcium phosphate, and solubilization of at least one part of the precipitated solid phase in a separated manner in a second aqueous chlorohydric acid solution, with formation of an aqueous solution containing phosphate ions, chloride ions and calcium ions to be extracted by an organic extractant in a liquid-liquid-type extraction.

14 Claims, 2 Drawing Sheets

U.S. PATENT DOCUMENTS

| | | |
|---|---|---|
| 3,919,395 A | 11/1975 | Hauge |
| 3,988,420 A | 10/1976 | Loewy et al. |
| 4,012,491 A | 3/1977 | Hauge |
| 4,088,738 A | 5/1978 | Hauge |
| 4,585,636 A | 4/1986 | Iosef et al. |
| 6,989,136 B2 * | 1/2006 | Takhim ...................... 423/319 |

FOREIGN PATENT DOCUMENTS

| | | |
|---|---|---|
| FR | 1396077 | 3/1965 |
| FR | 1427531 | 12/1965 |
| FR | 2115244 | 7/1972 |
| GB | 1051521 | 12/1966 |
| GB | 1142719 | 2/1969 |
| RU | 842083 | 6/1981 |

OTHER PUBLICATIONS

Database WPI, Section Ch, Week 197621, Derwent Pub. Ltd., London, XP002236427 of SU 481586A (E.I. Tyurin), Oct. 10, 1975 (Abstract).

I.M.I Staff Report: "Development and Implementation of Solvent Extraction Process in the Chemical Proces Industries" in Proc. Int. Solv. Extr. Conf., ISEC 171, the Hague, Apr. 19-23, 1971, Paper No. 94.

Derwent Abstract of SU-842083 entitled "Complex Mineral Fertiser from Lean Phosphate Ore", no date.

* cited by examiner

METHOD FOR THE PRODUCTION OF PHOSPHORIC ACID AND/OR A SALT THEREOF AND PRODUCTS THUS OBTAINED

The present invention relates to a method for producing phosphoric acid, in particular pure phosphoric acid, comprising at least one phosphate ore attack with a first aqueous solution of hydrochloric acid, with the formation of an attack liquor, a first separation, in the attack liquor, between an insoluble solid phase containing impurities and a separate aqueous phase comprising in solution phosphate ions, chloride ions and calcium ions, an extraction of an aqueous solution containing phosphate ions, chloride ions and calcium ions by an organic extraction agent, in order to form an aqueous extraction phase comprising chlorine ions and calcium ions and an organic extraction phase containing phosphoric acid, and a re-extraction of the organic extraction phase by an aqueous re-extraction agent, in order to isolate an aqueous re-extraction phase containing phosphate ions, as well as, possibly, a concentration of the aqueous re-extraction phase in order to form an aqueous solution of pure phosphoric acid.

Methods of this type have been known for a long time, involving a hydrochloric attack on the ore and a liquid-liquid extraction of the liquid phase resulting from a separation, from the attack liquor, of the insoluble materials (see for example the patents U.S. Pat. No. 3,304,157, GB-1051521 and ES-2013211, as well as the article I.M.I. Staff Report, Development and implementation of solvent extraction processes in the chemical process industries, in Proc. Int. Solv. Extr. Conference, ISEC'71, The Hague, Apr. 19-23, 1971, Paper No 94).

These methods have the drawback of generally making use, for the attack, of a concentrated solution of HCl, which may be as much as 20% and even 30% by weight. The ore to be used must be of good quality, that is to say with a high $P_2O_5$ content, and a fine grinding of the ore is generally required, which increases costs. During the attack a thermal shock is obtained, due not only to the exothermal nature of the reaction, but also to the dissolution energy released, and the insoluble materials are therefore difficult to separate, since the liquor obtained is viscous and loaded with original organic materials of the ore. Given the high temperature and the concentration of the HCl solution, significant problems of corrosion arise.

Another major drawback of these methods lies in the extraction, by an organic solvent, of an aqueous phase which has a relatively low $P_2O_5$ content. It contains at a maximum 5% to 6% of this by weight. Extraction is therefore difficult and with a poor yield, and the step of concentrating the aqueous solution of phosphoric acid obtained after re-extraction consumes a great deal of energy.

Finally, in the aqueous phase issuing from the extraction and containing in solution $CaCl_2$ and hydrochloric acid, it is necessary to recover the traces of organic solvent entrained. However, this aqueous phase is very bulky and this step also consumes a great deal of energy, in particular if to do this a steam entrainment is applied.

A hydrochloric attack method is also known in which the ore is subjected to a first limited attack with dilute hydrochloric acid. The solid fraction, thus enriched with $P_2O_5$, is then subjected to a second attack with hydrochloric acid and then concentrated, and then to a liquid-liquid extraction in order to produce phosphoric acid (see U.S. Pat. No. 3,988,420).

Other methods of producing phosphoric acid are of course known, for example the thermal method based on the combustion of phosphorus, or wet methods also based on an attack on the phosphate ores with an acid, generally sulphuric acid, the latter method giving rise to a high production of gypsum, as a by-product.

The aim of the present invention is to develop an improved method of producing phosphoric acid and/or a salt thereof, by wet method, by attack using hydrochloric acid. This method must make it possible to avoid the aforementioned drawbacks, in particular a fine grinding or calcination of the extracted ore, without having any particular requirement on the quality of the ore, and it must propose an efficient liquid-liquid extraction giving rise to a concentrated pure phosphoric acid solution, without harming the environment.

These problems are resolved according to the invention by a method as described at the start, which also comprises a neutralisation of the said aqueous phase separated from the attack liquor by the addition of a calcium compound in order to form with the said phosphate ions a calcium phosphate insoluble in water, which precipitates, a second separation, in the said neutralised aqueous phase, between an aqueous phase comprising in solution calcium ions and chloride ions and a precipitated solid phase based on the said calcium phosphate insoluble in water, and a solubilisation of at least part of the said precipitated solid phase separated, in a second aqueous solution of hydrochloric acid, with the formation in the said aqueous solution containing phosphate ions, chloride ions and calcium ions to be extracted by means of an organic extraction agent.

This method has the advantage of providing an attack on an ore which can have a moderate $P_2O_5$ concentration by means of a fraction of hydrochloric acid which can be dilute, a separation of a solid phase enriched with $P_2O_5$ with the non-attacked materials insoluble in water removed and a solubilisation of this solid phase enriched with $P_2O_5$ by a second more concentrated fraction of hydrochloric acid. As the hydrochloric attack takes place in a dilute and therefore non-viscous environment, the separation of the insoluble materials is simple and rapid, there is no release of heat during the attack, which advantageously occurs at room temperature, and the problems of corrosion by the hydrochloric acid are largely avoided.

Moreover, the liquid-liquid extraction is carried out in a solubilised liquid phase with a high $P_2O_5$ content and its efficiency can therefore be greatly increased thereby. The number of extraction stages for example can be appreciably reduced and any final concentration requires a lesser consumption of energy, compared with the prior art cited.

In the method according to the invention, the quality of the ore has little importance. Its $P_2O_5$ content can for example be from 15% to 38% by weight, without any problem, and ores with a favourable cost can therefore be used. It is possible for example to envisage an ore having, in % by weight, 20-38% $P_2O_5$, 34-40% Ca and 5 to 10% impurities, with a Ca/P ratio of 1.5 to 2.4.

Through the subsequent neutralisation, a precipitate is produced which can be termed "enriched" with $P_2O_5$ and purified with respect to the ore, since its $P_2O_5$ content can be from 40% to 50% by weight.

The ore does not have to be finely ground and it can have a grain size of around 150-500 µm.

The hydrochloric acid used in the attack is preferably in the dilute state. It advantageously has a maximum concentration in water of 10% by weight, advantageously from 3% to 6%, preferably less than or equal to 5%. This attack, which is not very aggressive, in a non-viscous medium, is thereby very selective, that is to say it solubilises the P2O5 preferentially and completely and few impurities. The separation of the insoluble and unattacked substances takes place in a simple and complete manner, which therefore makes it possible then to obtain an insoluble phosphate salt "enriched with P2O5" and profoundly devoid of impurities. In the attack liquor, the molar ratio between HCl and Ca is preferably between 0.6 and 1.3, advantageously between 0.7 and 1.2.

The method according to the invention therefore allows the use of ore with a low P2O5 content, for example containing Fe and Mg, and procures for the operator great flexibility in the choice of the ore on the market. It permits him the use of dilute hydrochloric acid, which also has a favourable cost, and makes it possible to avoid the problems of thermal shock and viscosity at the time of attack.

The separation of the attack liquor can be effected by an appropriate means, for example by filtration, decantation or a similar process.

The aqueous solution thus obtained contains in solution calcium chloride CaCl2, phosphoric acid and water-soluble calcium dihydrogenophosphate (MCP), and is brought to neutralisation.

In the neutralisation step, there is introduced into this aqueous solution a calcium compound, for example calcium hydroxide, calcium oxide, or a water-soluble calcium salt, such as calcium carbonate.

Through the increase in the pH, calcium monohydrogenophosphate (DCP) is formed, insoluble in water, which precipitates.

This precipitate can be separated, for example by filtration. The filtration cake can for example contain 40% to 50% P2O5, 25% to 28% Ca and possibly small traces of impurities.

For the solubilisation of the DCP, hydrochloric acid is used once again, but in a higher concentration, for example from 15% to 20% by weight. A clear solution is then obtained, since the insoluble materials have already been eliminated and the coefficient of extraction will be able to be favourable since the P2O5 concentration is already relatively high, around 8% to 15% by weight P2O5, preferably 10% to 13%, in the solubilised solution.

During the extraction step it is possible to use any appropriate organic extraction agent, for example those recommended in the patents U.S. Pat. No. 3,304,157, GB-1051521, GB-1142719, FR-1427531 and FR-1396077, in particular n-butanol.

According to one advantageous embodiment of the invention, the method also comprises, after the said extraction, a washing of the organic phase extracted by a fraction of the aqueous re-extraction phase, in order to remove from the extracted organic phase a hydrochloric acid content and calcium chloride entrained by it and any impurities still present. After re-extraction, an aqueous solution is thus obtained having a P2O5 concentration of 15% to 25% by weight, which is an excellent yield. Moreover, the residual HCl content may possibly be from 1% to 5% by weight, which makes it possible to reduce the recycling of HCl and the corrosion problems which are the consequence thereof.

According to an improved embodiment of the invention, the method also comprises a steam entrainment of traces of organic extraction agent from the aqueous extraction phase containing chloride ions and calcium ions. It is known how to recover the traces of organic extraction agent in the aqueous phase issuing from a liquid-liquid extraction. However, in the method according to the invention, part of the CaCl2 to be discharged as a by-product has already been isolated during the separation which took place after the precipitation of the DCP. There it was able to be eliminated, as it stood, without any particular purification step. The aqueous solution of CaCl2 coming from the extraction of the liquid phase enriched with P2O5 according to the invention is therefore a volume which is appreciably reduced compared with the prior art and the quantities of steam necessary for entraining the organic extraction agent are appreciably lower.

According to an improved embodiment of the invention, the method also comprises a treatment of the aqueous phase issuing from the second separation and containing calcium ions and chloride ions in solution, by an aqueous solution of sulphuric acid with the formation of insoluble calcium sulphate, which precipitates, and an aqueous phase based on hydrochloric acid, an isolation of the calcium sulphate precipitate and an at least partial recycling of the aqueous phase based on hydrochloric acid in order to form the said first and/or second aqueous solution of hydrochloric acid. The exploitation of the method according to the invention can thus be envisaged on industrial sites which do not have any hydrochloric acid. The recycled hydrochloric acid is of greater purity and therefore does not require frequent renewal.

As can be seen, the method according to the invention can be implemented in two successive modules, a first intended for the preparation of a solid phase based on DCP and a second intended for the production of phosphoric acid at the start of this solid phase based on DCP. Since there is no flow of material connecting the two modules, it is absolutely unnecessary for the steps performed in the second module to immediately follow those performed in the first module. It is therefore possible to conceive, for example, a drying of the solid phase based on DCP obtained after the precipitation and the separation of the DCP, storage of this dried solid phase and even transportation thereof to a site different from that where the steps of the first module are performed.

The present invention can therefore cover a method in which at least part of the DCP obtained by precipitation is used for purposes other than that of serving as a base material in the second module. It is possible for example to envisage the use of this phosphoric acid salt in the field of fertilisers or the feeding of cattle.

The present invention covers the steps provided for in each of the modules separately.

Consequently the present invention also concerns a method of preparing phosphoric acid salt.

A method of preparing DCP is already known, comprising at least one attack on phosphate ore by an aqueous solution of hydrochloric acid, with the formation of an attack liquor, a first separation, in the attack liquor, between an insoluble solid phase and an aqueous phase, a neutralisation of the said separated aqueous phase by the-addition of a calcium compound in order to form, with phosphate ions contained in this aqueous phase, a calcium phosphate insoluble in water, which precipitates, and a second separation, in the said neutralised aqueous phase, between a liquid phase and a precipitated solid phase based on the said calcium phosphate insoluble in water (see U.S. Pat. No. 3,988,420 already cited).

This method is in fact a method where the aqueous phase separated from the attack liquor contains as few phosphate ions as possible, these being able to be, simultaneously with the production of phosphoric acid, recovered in the form of DCP.

A method of preparing DCP is already known, by an attack on the ore by means of a concentrated solution of hydrochloric acid (35%) with all the drawbacks already cited above (see SU-A-1470663).

According to the invention, provision is made, unlike the method described above with regard to U.S. Pat. No. 3,988,420, for the attack on the phosphate ore to comprise a dissolving of the phosphate in the ore, the attack liquor containing this phosphate in the form of phosphate ions, and in that the solid phase separated from the attack liquor contains impurities and the aqueous phase separated from the attack liquor contains the said phosphate ions thereof, chloride ions and calcium ions, this aqueous phase being subjected to the said neutralisation and second-separation steps.

The invention also relates to a method of producing phosphoric acid, comprising a solubilisation of a solid phase based on a calcium phosphate insoluble in water in an aqueous solution of hydrochloric acid, with the formation of a solubilised aqueous solution containing phosphate ions, chloride ions and calcium ions, an extraction of the aqueous solution solubilised by an organic extraction agent, in order to form an aqueous extraction phase containing chloride ions and calcium ions and an organic extraction phase containing phosphoric acid, and a re-extraction of the organic extraction phase by means of an aqueous re-extraction agent, in order to isolate an aqueous re-extraction phase containing phosphate ions, as well as, possibly, a concentration of the re-extraction aqueous phase in order to form an aqueous solution of pure phosphoric acid.

The invention therefore also covers a production of phosphoric acid from solid commercially available DCP, and possibly manufactured by any method.

Other embodiments of the methods according to the invention are indicated in the claims given below.

Other details and particularities of the invention will emerge from the description given below non-limitingly of embodiments of the method according to the invention, with reference to the accompanying drawings.

Figure 1:
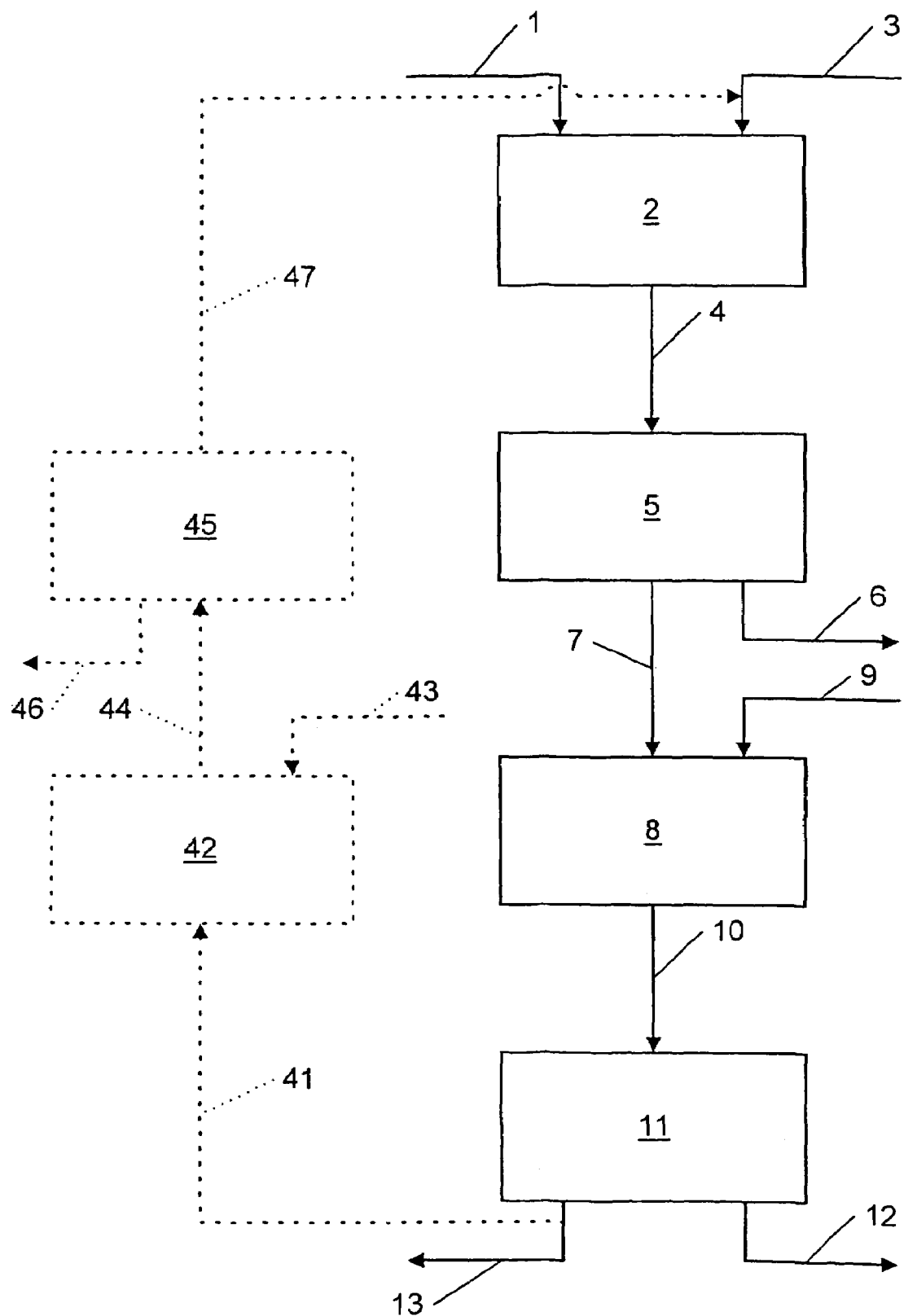
FIG. 1 depicts, in the form of a flow diagram, a module for purifying and enriching the ore which can be used in an embodiment of the method according to the invention.

As illustrated in FIG. 1, the phosphate ore extracted is fed at 1 into a digestion tank 2 where it is subjected to attack by a hydrochloric acid solution of around 5% by weight, brought into this tank through a pipe 3. Phosphate ore as extracted means that it is subjected neither to calcination nor to fine grinding, in particular in the mines where the extracted ore is in powder form. If it is a case of ore of volcanic origin, simple crushing can be provided to a grain size of around 150 to 500 μm.

In the digestion tank 2, the dissolution of calcium phosphate is rapid and intense, in the form of H3PO4 and soluble MCP. The cloudy liquid obtained is sent through the pipe 4 to a separation device 5, for example a filter press where the undissolved solids are separated at 6, after the advantageous addition of a suitable filtration adjuvant, known per se, and removed.

The liquid phase issuing from the separation contains, in dissolved form, phosphoric acid, monocalcium phosphate MCP, calcium chloride and a few residual impurities. The yield of the attack is greater than 80%, preferably 90% and very advantageously 95% by weight, expressed as P2O5, and the temperature is ambient temperature.

The liquid phase separated from the attack liquor is then transferred through the pipe 7 into a neutralisation tank 8, where the dicalcium phosphate DCP is precipitated by introducing, into the liquid phase, at 9, calcium derivatives which increase the pH, such as calcium carbonate or milk of lime.

In order to separate the precipitate, it is possible for example to discharge the neutralised liquid phase at 10 and to cause it to pass over a belt filter 11 where the solid material is separated, that is to say a moist cake of DCP 12, containing approximately 40-50% by weight P2O5, analysed on dry product, 25-28% Ca and possible traces of impurities. The filtrate is discharged at 13. It consists of an aqueous solution of CaCl2, easily eliminated, since it is almost non-polluting, and even easily reprocessable. The calcium chloride can be used for example as an antifreeze product on roadways.

It is also possible to make provision for directing this aqueous solution of very pure CaCl2 through a pipe 41 to a reactor 42, which is fed by the conduit 43 with an aqueous solution of sulphuric acid. In this reactor, stirred at a temperature of approximately 60° C., for one hour, insoluble calcium sulphate is formed, which precipitates in a very pure form. Through the pipe 44, the liquor resulting from the sulphuric attack is subjected to a separation step, for example by filtration at 45. The solid phase formed of calcium sulphate is discharged at 46 and the liquid phase formed of an aqueous solution of very pure HCl is returned, through the conduit 47, to the dilute hydrochloric acid supply pipe 3.

As sulphuric acid is more common and more available in large quantities than hydrochloric acid, this recycling further improves the yield of the hydrochloric attack and even makes it possible to provide this in places where HCl is difficult to procure.

Figure 2:
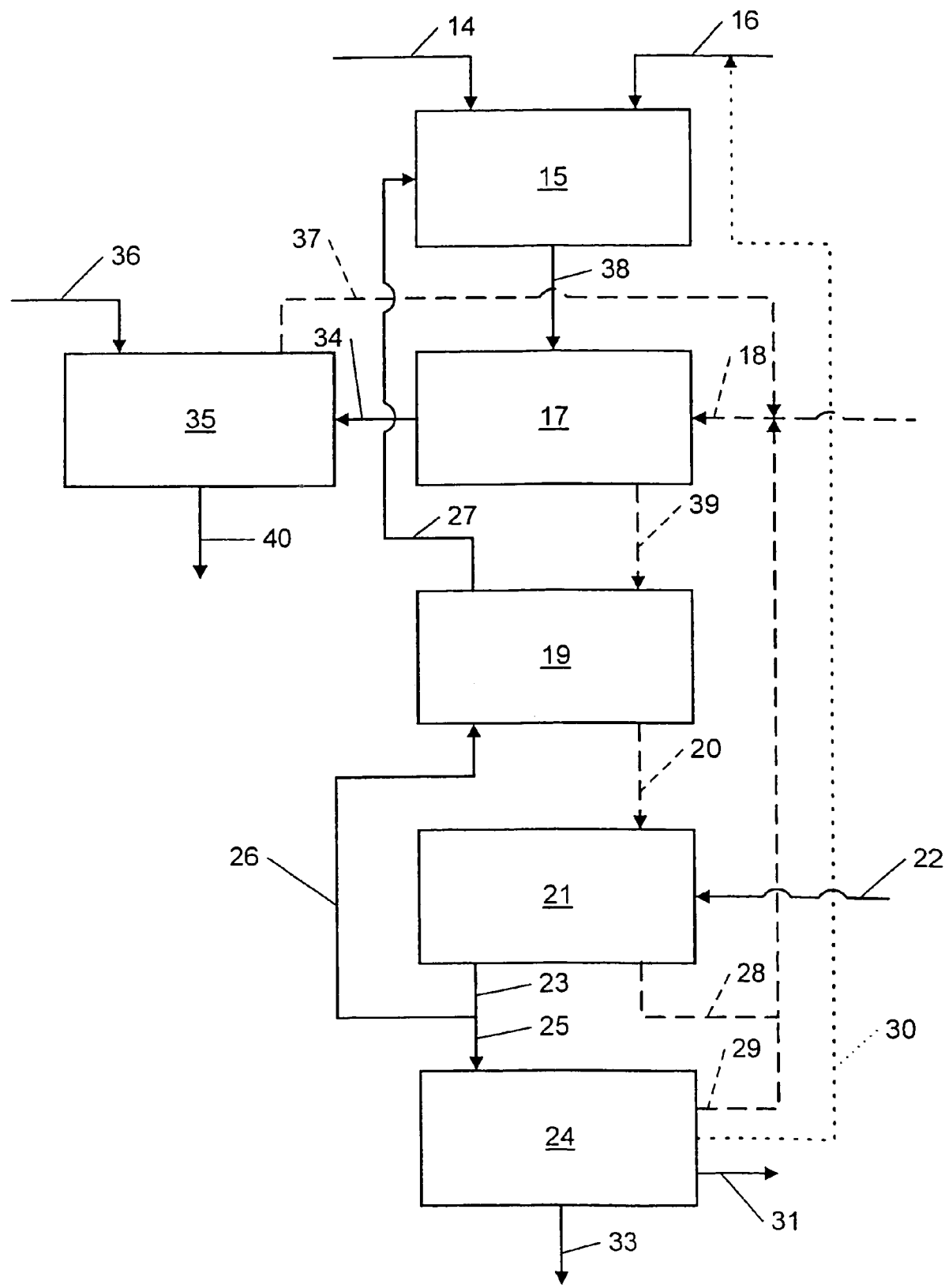
FIG. 2 depicts, in the form of a flow diagram, a phosphoric acid production module which can be used in an embodiment of the method according to the invention.

In the module illustrated in FIG. 2, it will then be possible to produce pure phosphoric acid by a liquid-liquid extraction. For this purpose, the DCP salt, for example obtained in the form of a filtration cake at 12 at the belt filter 11, is brought at 14 into a solubilisation tank 15, where it is solubilised by a new hydrochloric acid attack introduced at 16. However, this step is performed this time with a more concentrated solution of HCl, for example 15% to 20% by weight. This solubilisation makes it possible to obtain an aqueous solution containing phosphoric acid mixed with CaCl2, a soluble salt of calcium chloride. This solution has a P2O5 concentration of around 10% to 12% by weight, which will positively improve transfers at the subsequent liquid-liquid extraction operations and will give rise to concentrated phosphoric acid solutions at the time of re-extraction.

The elimination of the insoluble matter takes place during the attack in the tank 2, which in the liquid-liquid extraction avoids the problems of the formation of emulsions during treatments of the aqueous phase with an organic solvent. The use of purified DCP enriched with $P_2O_5$ for the preparation of the initial aqueous phase of the extraction thus affords more flexibility in the choice of the ore and reduces the number of extraction stages to be provided.

The solubilised aqueous phase is then sent through the pipe 38 into an extraction column 17, into which an organic solvent, for example n-butanol, by way of extraction agent, is fed in reverse flow through the pipe 18. The organic solvent selectively extracts the $P_2O_5$ from the aqueous phase and entrains it through the pipe 39 to a washing column 19, and then through the pipe 20 into a re-extraction column 21.

In the re-extraction column 21, the organic phase is put in contact with water fed in reverse flow by means of the pipe 22. The water extracts the $P_2O_5$ from the organic phase. The aqueous phase obtained leaves the column 21 through the pipe 23 and is distributed partly to a concentration device 24, through the pipe 25, and partly to the washing column 19, through the pipe 26. There the aqueous phase containing $P_2O_5$ serves for washing the organic phase in reverse flow, for eliminating the chloride content and the last impurities, not eliminated in the module illustrated in FIG. 1, and is then once again transferred into the solubilisation tank 15 by means of the pipe 27.

The organic phase coming from the re-extraction is recycled through the pipe 28 to the extraction column 17.

The concentration device 24 may be a normal triple-effect evaporation installation which successively vaporises the traces of solvent, which are recycled to the extraction column 17 through the pipe 29, the HCl still contained in solution, which is recycled to the feed pipe 16 for the solubilisation of DCP through the pipe 30, and a large amount of water, at 31. Phosphoric acid is harvested in the form of a concentrated purified solution, through the pipe 33.

The aqueous phase issuing from the extraction column 17 is then transferred through the pipe 34 to a steam entrainment column 35. Steam is introduced at 36 into this column and entrains the organic solvent load present in the aqueous phase. The organic solvent, entrained by steam, is recycled into the extraction column 17 through the pipe 37. The aqueous solution of $CaCl_2$, which may possibly still be treated in order to eliminate a few heavy metal impurities from it, can in its turn be discharged at 40.

As can be seen, only some of the $CaCl_2$ resulting from the introduction of HCl in the method must be treated by a steam entrainment, which greatly reduces the energy cost, compared with the methods which effect a liquid-liquid extraction directly on the liquid phase separated from the liquor resulting from the hydrochloric attack.

The invention will now be described in more detail by means of example embodiments, given non-limitingly.

EXAMPLE 1

Phosphate ore of Moroccan origin is fed at a rate of 15 kg/h into a stirred reactor in order to be attacked there by a 5% by weight solution of hydrochloric acid. The feed rate of the HCl solution is 141 litres/h, which gives an HCl/Ca ratio of 0.7.

The residence time in the attack reactor is 30 minutes. The non-viscous attack liquor is then transferred into a filter press after intermediate passage through a buffer tank (residence time in the latter approximately 1 hour). The temperature remains ambient. The insoluble matter is separated in the filter press.

The solution emerging from the filter press is routed at a rate of 188 litres/hour to two neutralisation reactors disposed in series. Calcium carbonate is supplied there at a rate of 5.8 kg/hour, which gives a Ca/P molar ratio of 1. The residence time is 100 minutes over both of the two reactors.

After reaction and formation of DCP, a small quantity of milk of lime is added to the pulp at the second neutralisation reactor in order to exhaust the phosphate load. The concentration of the milk of lime is 245 g of $Ca(OH)_2$/kg and the feed rate into the second reactor is 3 litres/hour.

The neutralised pulp is then directed to a belt filter. The cake obtained consists principally of DCP.

The addition of $Ca(OH)_2$ is calculated in order to obtain a Ca/P molar ratio in the pulp of 0.2. The pH in the filtered mother liquors is approximately 5 and the residual quantity of phosphate therein is less than 1 g/kg.

EXAMPLE 2

The conditions of Example 1 are repeated but in the neutralisation reactors only calcium carbonate is added at a rate of 7.1 kg/hour, which gives a Ca/P molar ratio of 1.2.

The following table illustrates the composition of the various products obtained during a process as applied in Example 1.

TABLE

| | Moisture (%) | $P_2O_5$ (% m/m) | Ca (mg/kg) | Cl (mg/kg) | Na (mg/kg) | K (mg/kg) | Mg (mg/kg) | F (mg/kg) | SO4 (mg/kg) | Si (mg/kg) | Fe (mg/kg) | As (mg/kg) |
|---|---|---|---|---|---|---|---|---|---|---|---|---|
| MCP filtrate | | 2.76 | 28365 | 47735 | 124 | — | 50 | 50 | 50 | — | 22.0 | 0.68 |
| Insolubles cake | 33.92 | | | | | | | | | | | |
| total | | 13.52 | 325430 | 16835 | 2896 | 585 | 545 | 207384 | 12236 | 9200 | 3700 | 12 |
| soluble | | 3.31 | 36327 | 37516 | | | | | | | | |
| DCP cake | dry | 36.27 | 289008 | 8036 | | | 23.5 | | | | 584 | 2.01 |

| | Moisture (%) | Al (mg/kg) | Cd (mg/kg) | Cu (mg/kg) | Pb (mg/kg) | Zn (mg/kg) | Ni (mg/kg) | Cr (mg/kg) | Ti (mg/kg) | V (mg/kg) | U (mg/kg) |
|---|---|---|---|---|---|---|---|---|---|---|---|
| MCP filtrate | | 4 | 1.8 | 0.42 | 0.31 | 9.5 | 3.9 | 6.2 | 33.0 | 3.1 | |
| DCP cake | dry | 139 | 0.65 | 1.3 | 3.7 | 36 | 3.5 | 73 | 7.6 | 56 | |

EXAMPLE 3a

In a stirred 2 litre reactor a solution of CaCl2 containing 50% CaCl2, as obtained as filtered mother liquors at the end of Example 1, is mixed continuously at a rate of 4 kg/hour with 96% concentrated sulphuric acid. The feed rate of the sulphuric acid is 0.54 kg/hour.

The residence time in the reactor is 30 minutes.

The pulp formed after the appearance of the gypsum crystals is then transferred into a Buchner filter. The temperature of the reaction is 40° C. The solution emerges from the filter at a rate of 3.36 kg/hour and contains mainly hydrochloric acid (10% HCl). It is recycled at the ore attack reactor for a new cycle. The gypsum cake (rate 1.18 kg/hour at 30% moisture) is washed and then discharged. The washing water is recycled with the filtrate. The cake obtained is mainly calcium sulphate dihydrate.

The addition of sulphuric acid is calculated so as to obtain in the pulp a Ca/H2SO4 molar ratio of 1.

Analysis of the hydrochloric acid solution recovered:
SO4=: 16544 ppm
Ca++: 3749 ppm
Cl−: 99507 ppm

EXAMPLE 3b

In a stirred 2 litre reactor, a solution of CaCl2 containing 15% CaCl2 is mixed continuously at a rate of 4 kg/hour with 96% concentrated sulphuric acid. The feed rate of the sulphuric acid is 0.48 kg/hour.

The residence time in the reactor is 30 minutes.

The pulp formed after the appearance of the gypsum crystals is then transferred into a Buchner filter. The temperature of the reaction is 40° C. The solution emerging from the filter at a rate of 3.41 kg/h and containing mainly hydrochloric acid (10% HCl) is recycled at the ore attack reactor for a new cycle. The gypsum cake (rate of 1.062 kg/hour at 30% moisture) is washed and then discharged. The washing water is recycled with the filtrate. The cake obtained is mainly calcium sulphate dihydrate.

The addition of the sulphuric acid is calculated so as to obtain in the pulp a Ca/H2SO4 molar ratio of 0.09.

Analysis of the hydrochloric acid solution recovered:
SO4=: 11045 ppm
Ca++: 6978 ppm
Cl−: 101846 ppm

EXAMPLE 4

DCP obtained by the method of Example 1 is allowed to be digested by a 20% solution of hydrochloric acid. The dissolution liquor has the following analysis: 20% H3PO4, 10% HCl, 10% CaCl2. This liquor is put in contact, in reverse flow, with an organic solvent, n-butanol, in a column at a rate of 100 litres/hour of aqueous phase and with an O/A ratio by volume (organic phase/aqueous phase) of 2. The phosphoric acid and hydrochloric acid pass into the solvent whilst the major part of the calcium chloride and impurities remain in the aqueous phase (P2O5 extraction yield of 80%). The organic solvent containing HCl and H3PO4 (analysis: 10% H3PO4, 2.5% HCl, 0.8% CaCl2) is put in contact in a three-stage extractor with a fraction of the aqueous solution of phosphoric acid obtained during the following phase (analysis: 30% H3PO4) and this with an O/A ratio by volume of 6. This operation eliminates from the organic solution the calcium chloride and the impurities entrained during the liquid-liquid extraction, which makes it possible to achieve high purities. The washing solution is then recycled at the head of the extraction by organic solvent. The efficiency of elimination of the calcium from the organic phase is very high: >99%.

The organic solution is washed in reverse flow with water in a column with several plates. The water extracts the phosphoric acid and hydrochloric acid of the organic phase. The organic solvent, with the acids removed, can be recycled at the extraction step. In addition, the phosphoric acid solution passes to a concentration step.

Yield of the operation: 80% re-extraction of P2O5. All these operations take place at ambient temperature.

The solution of dilute phosphoric acid, recovered, is treated by evaporation in order to concentrate the solution and to eliminate any traces still present of HCl and solvent, by distillation.

It must be understood that the present invention is in no way limited to the embodiments described above and that many modifications can be made thereto without departing from the scope of the accompanying claims.

The invention claimed is:

1. Method of producing phosphoric acid, comprising
   at least one phosphate ore attack with a first aqueous solution of hydrochloric acid having an HCl concentration of no more than 10% by weight, with the formation of an attack liquor, said attack comprising a dissolving of the phosphate of the ore in said first aqueous solution of hydrochloric acid with a yield of attack greater than 80% by weight, expressed as $P_2O_5$, the obtained attack liquor containing this dissolved phosphate in the form of phosphate ions,
   a first separation, in the attack liquor, between an insoluble solid phase containing impurities and a separated aqueous phase comprising in solution said phosphate ions, chloride ions and calcium ions,
   a neutralisation of the said aqueous phase separated from the attack liquor by the addition of a calcium compound in order to form with the said phosphate ions a calcium phosphate insoluble in water, which precipitates,
   a second separation, in the said neutralised aqueous phase, between an aqueous phase comprising in solution calcium ions and chloride ions and a precipitated solid phase based on the said calcium phosphate insoluble in water, and
   a solubilisation of at least part of the said precipitated solid phase separated, in a second aqueous solution of hydrochloric acid having a HCl concentration greater than that of said first aqueous solution of hydrochloric acid, with the formation of an aqueous solution containing phosphate ions, chloride ions and calcium ions,
   an extraction of said aqueous solution containing phosphate ions, chloride ions and calcium ions by an organic extraction agent, in order to form an aqueous extraction phase comprising chlorine ions and calcium ions and an organic extraction phase containing phosphoric acid; and
   a re-extraction of the organic extraction phase by an aqueous re-extraction agent, in order to isolate an aqueous re-extraction phase containing phosphate ions.

2. Method according to claim 1, characterised in that the said first aqueous solution of hydrochloric acid has an HCl concentration of 3% to 6% by weight.

3. Method according to claim 1, characterised in that, in the attack liquor, the molar ratio between HCl and Ca is between 0.6 and 1.3.

4. Method according to claim 1, characterised in that the attack step is performed at ambient temperature.

5. Method according to claim 1, characterised in that the calcium compound of the neutralisation step is chosen from amongst the group consisting of calcium hydroxide, calcium oxide and water-soluble calcium salts, and in that the calcium phosphate insoluble in water is calcium monohydrogenophosphate (DCP).

6. Method according to claim 1, characterised in that the said separated precipitated solid phase, based on the said insoluble calcium phosphate, has a concentration of 40% to 50% by weight $P_2O_5$ and 25% to 28% Ca.

7. Method according to claim 1, characterised in that the said second aqueous solution of hydrochloric acid has an HCl concentration of between 15% and 20% by weight.

8. Method according to claim 1, characterised in that the said solubilised aqueous solution, to be extracted, has a $P_2O_5$ concentration of 8% to 15% by weight.

9. Method according to claim 1, characterised in that it also comprises, after the said extraction, washing of the organic extraction phase by a fraction of the aqueous re-extraction phase, in order to eliminate from the organic extraction phase a hydrochloric acid and calcium chloride content entrained by it and any impurities still present.

10. Method according to claim 1, characterised in that it also comprises a steam entrainment of traces of organic extraction agent from the aqueous extraction phase containing chlorine ions and calcium ions.

11. Method according to claim 9, characterised in that the aqueous re-extraction phase containing phosphate ions has a $P_2O_5$ concentration of 15% and 25% by weight.

12. Method according to claim 1, characterised in that the phosphate ore has a coarse grain size between 150 and 500 µm, and a $P_2O_5$ content of 15% to 38% by weight.

13. Method according to claim 1, characterised in that it also comprises a treatment of the said aqueous phase issuing from the second separation, containing in solution calcium ions and chloride ions, by means of an aqueous solution of sulphuric acid with the formation of insoluble calcium sulphate, which precipitates, and an aqueous phase based on hydrochloric acid, an isolation of the calcium sulphate precipitate and an at least partial recycling of the aqueous phase based on hydrochloric acid in order to form the said first and/or second aqueous solution of hydrochloric acid.

14. Method according to claim 1, further comprising a concentrating of the aqueous re-extraction phase in order to form an aqueous solution of pure phosphoric acid.

* * * * *